(12) United States Patent
Naskali et al.

(10) Patent No.: US 8,223,227 B2
(45) Date of Patent: Jul. 17, 2012

(54) READ OUT METHOD FOR A CMOS IMAGER WITH REDUCED DARK CURRENT

(75) Inventors: Matti Juhani Naskali, Tokyo (JP); Juha Heikki Alakarhu, Tampere (FI)

(73) Assignee: Nokia Corporation, Espoo (FI)

( * ) Notice: Subject to any disclaimer, the term of this patent is extended or adjusted under 35 U.S.C. 154(b) by 245 days.

(21) Appl. No.: 12/443,474

(22) PCT Filed: Sep. 28, 2006

(86) PCT No.: PCT/EP2006/009475
§ 371 (c)(1),
(2), (4) Date: Apr. 20, 2010

(87) PCT Pub. No.: WO2008/037287
PCT Pub. Date: Apr. 3, 2008

(65) Prior Publication Data
US 2010/0283875 A1    Nov. 11, 2010

(51) Int. Cl.
*H04N 9/64* (2006.01)
(52) U.S. Cl. ........................... 348/243; 348/251
(58) Field of Classification Search .................. 348/243, 348/245, 248, 249, 250–251, 246, 252, 255, 348/241
See application file for complete search history.

(56) References Cited

U.S. PATENT DOCUMENTS

| 6,900,837 | B2 * | 5/2005 | Muramatsu et al. | 348/243 |
|---|---|---|---|---|
| 7,463,294 | B2 * | 12/2008 | Tsuda | 348/251 |
| 7,843,501 | B2 * | 11/2010 | Suzuki | 348/246 |
| 7,868,935 | B2 * | 1/2011 | Egawa | 348/243 |
| 2004/0130757 | A1 | 7/2004 | Mabuchi | |
| 2004/0263641 | A1 * | 12/2004 | Tsuda | 348/222.1 |
| 2005/0243193 | A1 | 11/2005 | Gove et al. | |
| 2008/0012969 | A1 * | 1/2008 | Kasai et al. | 348/266 |

FOREIGN PATENT DOCUMENTS

| EP | 0954170 A2 | 11/1999 |
|---|---|---|
| EP | 1341374 A2 | 9/2003 |
| JP | 58009478 A | 1/1983 |
| JP | 2000050162 A | 12/2000 |
| JP | 2004007068 A | 1/2004 |
| JP | 2004172972 A | 6/2004 |
| JP | 2005045552 A | 2/2005 |
| JP | 2006222689 A | 8/2006 |
| KR | 2005-0117332 A | 12/2005 |

OTHER PUBLICATIONS

Extended European Search Report received for corresponding European Patent Application No. 09176319.3, dated Feb. 9, 2010, 8 pages.

(Continued)

*Primary Examiner* — Chieh M Fan
*Assistant Examiner* — Ahmed A Berhan
(74) *Attorney, Agent, or Firm* — Harrington & Smith (57) ABSTRACT

The invention relates to an apparatus and method, for capturing an electronic image using a CMOS imager having an electronic shutter and a reduced dark current component in its image output signal. The dark current is reduced by—reading out each line of the CMOS imager in normal and reversed order and subsequent processing.

17 Claims, 4 Drawing Sheets

OTHER PUBLICATIONS

International Search Report and Written Opinion received for corresponding Patent Cooperation Treaty Application No. PCT/EP2006/009475, dated Jul. 25, 2007, 25 pages.

International Preliminary Report on Patentability received for Patent Cooperation Treaty Application No. PCT/EP2006/009475, dated Oct. 15, 2008, 12 pages.

Office Action received for corresponding Korean Patent Application No. 2009-7008560, dated Aug. 23, 2010, 8 pages.

Office Action received for corresponding European Patent Application No. 06805956.7, dated Feb. 8, 2010, 7 Pages.

Office Action received for corresponding European Patent Application No. 09176319.3, dated Aug. 19, 2010, 11 Pages.

Product Summary Kodak KAC-9630 Image Sensor 126 (H) X 98 (V) Monochrome CMOS Image Sensor, Eastman Kodak Company, 2006. Kodak and Pixelux are trademarks. Revision 1.1.

Office Action received for corresponding Chinese Patent Application No. 200680055834.6, dated Dec. 4, 2010, 10 Pages.

Office Action received for corresponding European Patent Application No. 09176319.3, dated Jan. 21, 2011, 5 Pages.

Office Action received for corresponding Japanese Patent Application No. 2009-525926, dated Mar. 14, 2011, 7 Pages.

Office Action received for corresponding Korean Patent Application No. 2009-7008560, dated Feb. 22, 2011.

* cited by examiner

READ OUT METHOD FOR A CMOS IMAGER WITH REDUCED DARK CURRENT

RELATED APPLICATION

This application was originally filed as PCT Application No. PCT/EP2006/009475 filed Sep. 28, 2006.

The invention relates to an apparatus and method, and particularly an apparatus and method for capturing an electronic image.

BACKGROUND

CMOS image sensors may use a rolling shutter, in which pixels in a pixel array are electronically shuttered line by line. The term "electronic shuttering" relates to the electronic control of a pixel to define an exposure period in which the pixel is exposed to light for the capture of an image. The end of the exposure period may be defined by the readout of the pixel. Alternatively, the exposure period may be terminated prior to readout. The total time from the start of the exposure period to the end of readout is known as the integration time.

Figure 1:
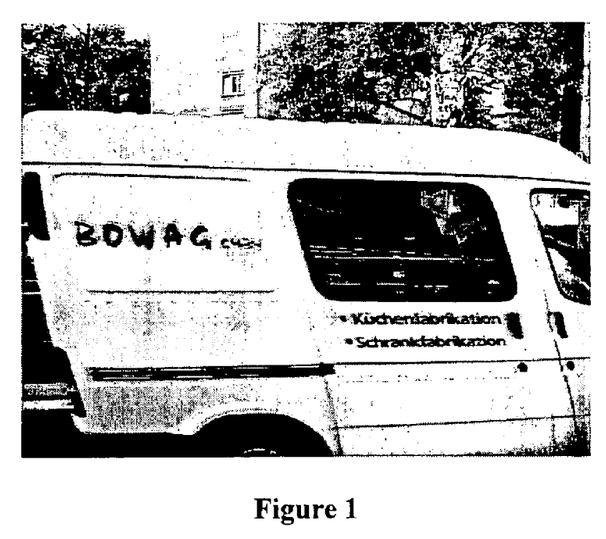
FIG. 1 shows a picture of a moving object distorted by time-displacement artefacts.
Figure 2:
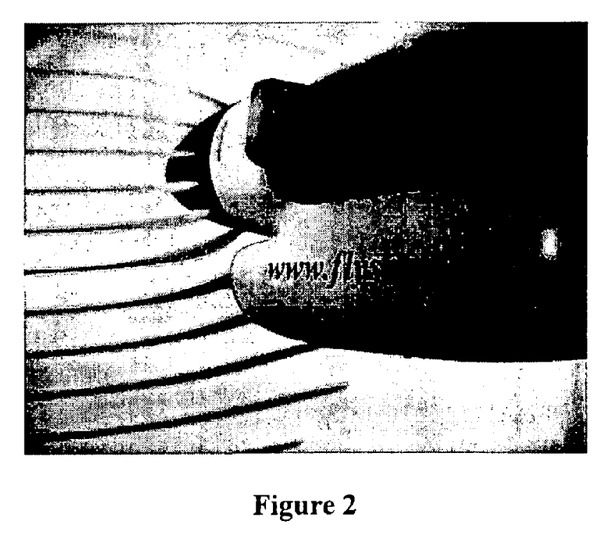
FIG. 2 shows a picture of a moving object distorted by time-displacement artefacts.

Sensors which use a rolling shutter distort images of moving objects because the object moves between the times at which successive lines are electronically shuttered. The distortion may take the form of time-displacement artefacts, as shown in FIG. 1 and FIG. 2.

A mechanical shutter can be used to overcome the problem, but adds to the cost, complexity and size of the image-capturing apparatus.

Another way to avoid the problem is to use a global shutter, in which all pixels are electronically shuttered simultaneously. This is usually followed by a readout stage in which pixels are read out line by line. Simultaneous readout is not economical since it requires a separate readout structure and line from each pixel to output or memory.

The global shutter method suffers due to increased dark-current error. Dark current is the current generated in a pixel when no light is incident on the pixel. When the exposure period begins, charge starts to generate at a rate depending on the amount of light striking the pixel. This charge is generated only during the exposure period. However, charge is also accumulated due to dark current, leading to an inaccurate reading. The accumulation of charge due to dark current occurs throughout the integration time, i.e. it continues during and after the exposure period and does not end until the integration value of the pixel is read out. As the pixels are read out line by line, the integration time for the last pixel is longer than for the first pixel, and so the dark-current error gradually increases from one end of the image to the other. This is unlike a rolling shutter in which every pixel has an identical integration time. Furthermore, the integration time when using a global shutter can be higher than when using a rolling shutter, leading to a more significant dark-current error.

The listing or discussion of a prior-published document in this specification should not necessarily be taken as an acknowledgement that the document is part of the state of the art or is common general knowledge.

SUMMARY

An apparatus for capturing an electronic image may comprise a pixel array comprising a plurality of light-sensitive pixels arranged to be exposed to light to capture an electronic image;

readout circuitry arranged to read out light-intensity values from first and second pixel groups in the pixel array at different times to capture light-intensity values for the image, each pixel group comprising one or more pixels;

wherein the apparatus comprises noise-compensation circuitry arranged to compensate for dark current in the pixels of the pixel array by using light-intensity values obtained at the different times from respective first and second pixel groups.

A pixel group may comprise a single pixel, a line of pixels in the array (i.e. the whole or a part of a row or column), more than one line, or any other collection of pixels.

In any embodiment, pixels may be electronically shuttered simultaneously over the whole pixel array to implement a global shutter, or may be electronically shuttered in groups (e.g. line by line) to implement a rolling shutter. However, the apparatus offers greater advantages when a global shutter is implemented, since time-displacement artefacts are avoided.

In a first embodiment, the readout circuitry may be arranged to read out the light-intensity values from the first and second pixel groups in a first predetermined group order in a first reading, and subsequently to reread light-intensity values from the first and second pixel groups in a second predetermined group order in a second reading, the second predetermined group order being the reverse of the first predetermined group order.

While only two groups are mentioned, it is to be understood that the invention is applicable to any number of groups being two or higher. For example, the readout circuitry may be arranged to read out the light-intensity values from a plurality of pixel groups in a first predetermined group order in a first reading, and subsequently to reread light-intensity values from a plurality of pixel groups in a second predetermined group order in a second reading, the second predetermined group order being the reverse of the first predetermined group order.

In the case that a group comprises more than one pixel, the pixels in the group are read out simultaneously, for example in a line-by-line manner using a shift register. In this case, a group order is the order in which groups are read out. In the case that a group comprises a single pixel, a group order is the order in which individual pixels are read out. Groups may be read out in consecutive order moving from one end of the pixel array to the other, or in any other order.

In many implementations, the dark-current error increases at a constant rate in each pixel across the pixel array. The dark-current error in respect of the pixel group which is read last in the first reading will be higher than that in respect of the pixel group which is read first in the first reading. After the first reading, this would result in a dark-current error which gradually increases from one end of the image to the other, as discussed above. However, by rereading the light-intensity values from pixel groups in reverse order, the dark-current error which results from the second reading increases in the reverse direction to that of the first reading. This allows various operations to be readily performed in order to even out the dark-current error and/or to remove it.

The noise-compensation circuitry may be arranged to calculate an average light-intensity value for a pixel in a respective group from the respective light-intensity values obtained for the pixel in the first and second readings. This operation results in a dark-current error which is even across the image. Although the dark-current error still exists, it is preferable for it to be even rather than gradually increasing.

The noise-compensation circuitry may be arranged to subtract a dark-current error from the average light-intensity value for the pixel to obtain a noise-compensated light-intensity value for the pixel.

The pixel array may comprise one or more optically-shielded light-sensitive pixels (or "black" pixels). The readout circuitry may be arranged to read out values from the or each black pixel in the first and second readings. The noise-compensation circuitry may be arranged to calculate an average value from the values obtained from the or each black pixel in the first and second readings, the average value representing a dark-current error.

Alternatively, the apparatus may comprise a mechanical shutter, in which case a dark frame can be captured, and removed from a primary image.

In a second embodiment, the readout circuitry may be arranged to obtain a first dark-current error associated with reading the light-intensity values from the first pixel group, and to obtain a second dark-current error associated with reading the light-intensity values from the second pixel group, the first and second pixel groups being spaced apart from other intermediate pixel groups. The noise-compensation circuitry may be arranged to interpolate the first and second dark-current errors to calculate one or more dark-current errors for the intermediate pixel groups.

In this way, the dark current error for each group can readily be calculated in order to allow for operations to remove it to be performed.

The noise-compensation circuitry may be arranged to subtract the dark-current error from the light-intensity value of a pixel to obtain a noise-compensated light-intensity value for a pixel.

The pixel array may comprise one or more optically-shielded light-sensitive pixels arranged to be used by the readout circuitry to obtain the first and second dark-current errors.

The apparatus may be arranged such that the first and second pixel groups can be exposed to light simultaneously. Additionally or alternatively, the apparatus may be arranged such that the first and second pixel groups can be exposed to light at different times. The apparatus may be arranged such that a pixel group can be exposed to light and its light-intensity values read by the readout circuitry before a subsequent pixel group is exposed to light.

The apparatus may comprise a digital camera. Alternatively, the apparatus may comprise a module or a functional block for a digital camera.

A method of capturing an electronic image may comprise
  exposing a plurality of light-sensitive pixels in a pixel array to light to capture an electronic image;
  reading light-intensity values from first and second pixel groups in the pixel array at different times to capture light-intensity values for the image, each pixel group comprising one or more pixels;
  compensating for dark current in the pixels of the pixel array by using light-intensity values obtained at the different times from respective first and second pixel groups.

The method may comprise reading the light-intensity values from the first and second pixel groups in a first predetermined group order in a first reading, and subsequently rereading light-intensity values from the first and second pixel groups in a second predetermined group order in a second reading, the second predetermined group order being the reverse of the first predetermined group order.

The method may comprise calculating an average light-intensity value for a pixel in a respective group from the respective light-intensity values obtained for the pixel in the first and second readings.

The method may comprise subtracting a dark-current error from the average light-intensity value for the pixel to obtain a noise-compensated light-intensity value for the pixel.

The method may comprise obtaining a first dark-current error associated with reading the light-intensity values from the first pixel group, and obtaining a second dark-current error associated with reading the light-intensity values from the second pixel group, the first and second pixel groups being spaced apart from other intermediate pixel groups; and
  interpolating the first and second dark-current errors to calculate one or more dark-current errors for the intermediate pixel groups.

The method may comprise subtracting the dark-current error from the light-intensity value of a pixel to obtain a noise-compensated light-intensity value for a pixel.

An apparatus for capturing an electronic image may comprise
  a pixel array comprising a plurality of light-sensitive pixels arranged to be exposed to light to capture an electronic image;
  readout circuitry arranged to read out light-intensity values from a plurality of pixel groups in the pixel array in a first predetermined group order in a first reading, and subsequently to reread light-intensity values from the plurality of pixel groups in a second predetermined group order in a second reading, the readout circuitry being arranged to read each group at a different time to other groups in each of the first and second readings, each pixel group comprising one or more pixels, the second predetermined group order being the reverse of the first predetermined group order.

An apparatus for capturing an electronic image may comprise
  a pixel array comprising a plurality of light-sensitive pixels arranged to be exposed to light to capture an electronic image;
  readout circuitry arranged to read out light-intensity values from one or more pixel groups in the pixel array to capture light-intensity values for the image, the or each pixel group comprising one or more pixels, the readout circuitry being arranged to obtain a first dark-current error before reading the light-intensity values and to obtain a second dark-current error after reading the light-intensity values; and
  noise-compensation circuitry arranged to interpolate the first and second dark-current errors to calculate a dark current error for the or each pixel group.

The apparatus may comprise a plurality of pixel groups, the readout circuitry being arranged to read each group at a different time to other groups.

A method of capturing an electronic image may comprise
  reading out light-intensity values from a plurality of pixel groups in a pixel array in a first predetermined group order in a first reading, and subsequently rereading light-intensity values from the plurality of pixel groups in a second predetermined group order in a second reading, the method comprising reading each group at a different time to other groups in each of the first and second readings, each pixel group comprising one or more pixels, the second predetermined group order being the reverse of the first predetermined group order.

A method of capturing an electronic image may comprise
reading out light-intensity values from one or more pixel groups in a pixel array to capture light-intensity values for an image, the or each pixel group comprising one or more pixels, obtaining a first dark-current error before reading the light-intensity values and obtaining a second dark-current error after reading the light-intensity values; and interpolating the first and second dark-current errors to calculate a dark current error for the or each pixel group.

An apparatus for capturing an electronic image may comprise
an array comprising a plurality of light-sensitive means arranged to be exposed to light to capture an electronic image;
means for reading out light-intensity values from first and second groups of light-sensitive means in the array at different times to capture light-intensity values for the image, each group comprising one or more light-sensitive means;
means for compensating for dark current in the light-sensitive means of the array by using light-intensity values obtained at the different times from respective first and second groups.

The means for reading out light-intensity values may be arranged to read out the light-intensity values from the first and second groups in a first predetermined group order in a first reading, and subsequently to reread light-intensity values from the first and second groups in a second predetermined group order in a second reading, the second predetermined group order being the reverse of the first predetermined group order.

The means for reading out light-intensity values may be arranged to obtain a first dark-current error associated with reading the light-intensity values from the first group, and to obtain a second dark-current error associated with reading the light-intensity values from the second group, the first and second groups being spaced apart from other intermediate groups. The means for compensating for dark current may be arranged to interpolate the first and second dark-current errors to calculate one or more dark-current errors for the intermediate groups.

An apparatus for capturing an electronic image may comprise
an array comprising a plurality of light-sensitive means arranged to be exposed to light to capture an electronic image;
means for reading out light-intensity values from a plurality of groups of light-sensitive means in the array in a first predetermined group order in a first reading, and subsequently to reread light-intensity values from the plurality of groups in a second predetermined group order in a second reading, the means for reading out light-intensity values being arranged to read each group at a different time to other groups in each of the first and second readings, each group comprising one or more light-sensitive means, the second predetermined group order being the reverse of the first predetermined group order.

An apparatus for capturing an electronic image may comprise
an array comprising a plurality of light-sensitive means arranged to be exposed to light to capture an electronic image;
means for reading out light-intensity values from one or more groups of light-sensitive means in the pixel array to capture light-intensity values for the image, the or each group comprising one or more light-sensitive means, the means for reading out light-intensity values being arranged to obtain a first dark-current error before reading the light-intensity values and to obtain a second dark-current error after reading the light-intensity values; and
means for interpolating the first and second dark-current errors to calculate a dark current error for the or each group.

A computer program product may comprise computer-executable code which, when run on a computer, causes the computer
to expose a plurality of light-sensitive pixels in a pixel array to light to capture an electronic image;
to read light-intensity values from first and second pixel groups in the pixel array at different times to capture light-intensity values for the image, each pixel group comprising one or more pixels;
to compensate for dark current in the pixels of the pixel array by using light-intensity values obtained at the different times from respective first and second pixel groups.

The computer-executable code, when run on a computer, may further cause the computer
to read the light-intensity values from the first and second pixel groups in a first predetermined group order in a first reading, and subsequently to reread light-intensity values from the first and second pixel groups in a second predetermined group order in a second reading, the second predetermined group order being the reverse of the first predetermined group order.

The computer-executable code, when run on a computer, may further cause the computer
to obtain a first dark-current error associated with reading the light-intensity values from the first pixel group, and to obtain a second dark-current error associated with reading the light-intensity values from the second pixel group, the first and second pixel groups being spaced apart from other intermediate pixel groups; and
to interpolate the first and second dark-current errors to calculate one or more dark-current errors for the intermediate pixel groups.

A computer program product may comprise computer-executable code which, when run on a computer, causes the computer
to read out light-intensity values from a plurality of pixel groups in a pixel array in a first predetermined group order in a first reading, and subsequently to reread light-intensity values from the plurality of pixel groups in a second predetermined group order in a second reading, each group being read at a different time to other groups in each of the first and second readings, each pixel group comprising one or more pixels, the second predetermined group order being the reverse of the first predetermined group order.

A computer program product may comprise computer-executable code which, when run on a computer, causes the computer
to read out light-intensity values from one or more pixel groups in a pixel array to capture light-intensity values for an image, the or each pixel group comprising one or more pixels, to obtain a first dark-current error before reading the light-intensity values and to obtain a second dark-current error after reading the light-intensity values; and interpolate the first and second dark-current errors to calculate a dark current error for the or each pixel group.

An apparatus comprising
means for capturing an electronic image using an array of light-sensitive elements arranged to be exposed to light to capture the electronic image;
means for reading out light-intensity values from first and second groups of the light-sensitive elements at different times to capture light-intensity values for the image, each light-sensitive element group comprising one or more light-sensitive element;
wherein the apparatus comprises means for noise-compensation arranged to compensate for dark current in the light-sensitive elements by using light-intensity values obtained at the different times from respective first and second groups of light-sensitive elements.

Any circuitry of the invention may include one or more processors, memories and bus lines. One or more of the circuitries described may share circuitry elements.

The present invention includes one or more aspects, embodiments and/or features of said aspects and/or embodiments in isolation and/or in various combinations whether or not specifically stated (including claimed) in that combination or in isolation.

BRIEF DESCRIPTION OF THE DRAWINGS

A description is now given, by way of example only, reference being made to the accompanying drawings, in which:—

DETAILED DESCRIPTION

Figure 3:
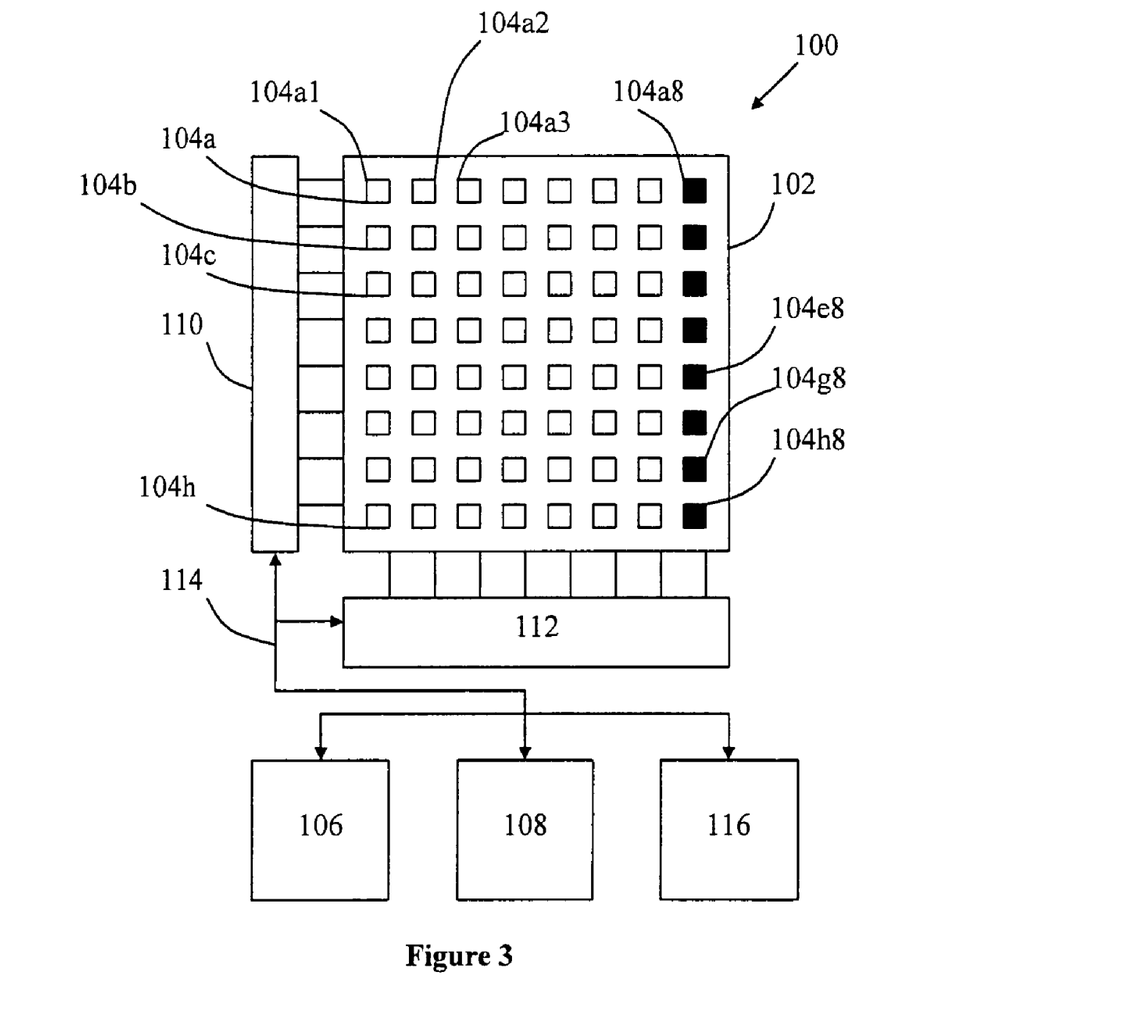
FIG. 3 is a schematic diagram of apparatus according to the invention.

FIG. 3 is a schematic diagram of apparatus 100 for capturing an electronic image. The apparatus 100 may form part of a digital camera, for example, or any other electronic device in which image-capture capability is desirable, for example a mobile telephone or personal digital assistant.

The apparatus 100 includes a pixel array 102 comprising a plurality of light-sensitive pixels, for example those designated by the numerals $104n1$-$104n7$, arranged to be exposed to light to capture an electronic image, and a plurality of optically-shielded or "black" pixels, for example those designated by the numerals $104n8$. The term "n" designates one of the lines from "a" to "h" shown in FIG. 3. The apparatus 100 further includes readout circuitry 106, noise-compensation circuitry 108, a row decoder 110, a shift register 112 and electronic shuttering circuitry 116. Each component is coupled to the other components via a bus 114. Although each component is shown to be coupled to each other component by the bus 114, it is to be understood that the components may be connected differently, for example by only coupling components together when such coupling is required. Furthermore, the components may comprise parts or functions of a single processing unit.

The black pixels $104n8$ are masked from the light to which the other pixels $104n1$-$104n7$ are exposed but in other respects the black pixels $104n8$ are identical to the other pixels $104n1$-$104n7$. Thus, the output of the black pixels $104n8$ can be used to determine the dark-current error in the pixels $104n1$-$104n7$.

The row decoder 110 is used to address pixels $104n1$-$104n8$ in the pixel array 102. The shift register 112 is arranged such that light-intensity values from the pixels $104n1$-$104n8$ can be read out line by line, i.e. in rolling order.

The capture of an electronic image using the apparatus 100 consists of at least two stages: an electronic shuttering stage followed by a readout stage. In the electronic shuttering stage, the electronic shuttering circuitry 116 resets every pixel $104n1$-$104n8$ in the array 102 simultaneously and exposes the pixels $104n1$-$104n8$ to light. At the end of a predetermined exposure period following the reset, the electronic shuttering circuitry 116 ends the exposure of every pixel $104n1$-$104n8$ in the array 102 simultaneously. Thus, a global shutter is implemented. During the exposure period, the pixels are exposed to light so as to capture an image. The arrangement whereby light is conveyed to the pixels is not described herein and any appropriate known arrangement (or future development) may be used. In the readout stage, the integrated values (or light-intensity values) are transferred out of the pixel array 102 and into memory. The apparatus may comprise sampling circuitry, amplification circuitry and/or analogue-to-digital conversion circuitry in order to extract the light-intensity values from the pixel array 102. However, the details of those circuits are not described herein, and any appropriate known circuitry (or future development) may be used. The details of the readout stage will now be described with respect to first and second embodiments.

In a first embodiment, the readout circuitry 106 is arranged to perform two readings of light-intensity values of pixels $104n1$-$104n8$ in the pixel array 102: a first reading and a second reading.

In the first reading, the readout circuitry 106 reads out consecutive lines of pixels 104a, 104b, 104c, . . . , 104h by successively moving the values of lines of pixels 104a, 104b, 104c, . . . , 104h into the shift register 112, starting with a line (104a, 104h) at one end of the pixel array 102 and finishing with a line (104h, 104a) at the other end. Following the readout of each line, the values are shifted one by one from the shift register 112 into the readout circuitry 106 and stored in memory (not shown) of the readout circuitry 106. In a variant, the memory is an additional component of the apparatus 100 separate to the readout circuitry 106.

Subsequently, in the second reading, the readout circuitry 106 rereads light-intensity values from the lines of pixels 104a, 104b, 104c, . . . , 104h in the reverse order to that in which the lines were read out in the first reading. Thus, the line which was read out last in the first reading is read out first in the second reading, and the line which was read out first in the first reading is readout last in the second reading. So, for example, if in the first reading line 104a was read first and line 104h was read last, line 104h would be read first and line 104a would be read last in the second reading. Again, the values are shifted into memory. In this embodiment, by shifting the values of whole lines of pixels $104n1$-$104n8$ simultaneously into the shift register 112, the pixels in any one line are read out simultaneously.

In a variant, the pixels 104a1, 104a2, 104a3 . . . , 104a8, 104b1, 104b2, . . . 104h1, 104h8 are individually read out from the array 102 one by one. In this case, the pixels are read out individually in the second reading in the reverse order to that in which they were read out in the first reading. For example, in a first reading 104a1, 104a2, 104a3, . . . 104a8, 104b1, . . . 104b8, . . . 104h1, . . . , 104h8, and in a second reading 104h8, 104h7, . . . 104h1, 104g8, . . . 104g1, . . .

104a8, ... 104a1. In another embodiment, the first reading may be done using the sequence 104a1, 104a2, 104a3, ... 104a8, 104b8, ..., 104b1, ..., 104c1, ... 104c8, ..., 104g1, ..., 104g8, 104h8, ... 104h1, and in the second reading 104h1, ... 104h8, 104g8, ..., 104g1, ..., 1048c8, ... 104c1, 104b1, ..., 104b8, 104a8, ..., 104a1.

The noise-compensation circuitry 108 is coupled to the readout circuitry 106. (In a variant, the readout circuitry 106 and noise-compensation circuitry from part of a single processing unit.) The noise-compensation circuitry 108 is arranged to receive the light-intensity values readout from the pixel array 102 by the readout circuitry 106, and to calculate a first/second average light-intensity value for each pixel 104n1-104n8 from the light-intensity values obtained for the pixels 104n1-104n8 in the first and second readings. By this averaging process, the dark-current error in the light-intensity values is evened out across the pixel array 102, owing to the fact that the pixels were read out in the second reading in the opposite direction to the first reading. The noise-compensation circuitry 108 is further arranged to calculate the dark-current error using the average values obtained from the black pixels 104n8 and to subtract the dark-current error from the average light-intensity values of each pixel 104n1-104n7 to obtain a noise-compensated light-intensity value for each pixel 104n1-104n7. This is explained further in relation to FIG. 4.

Figure 4:
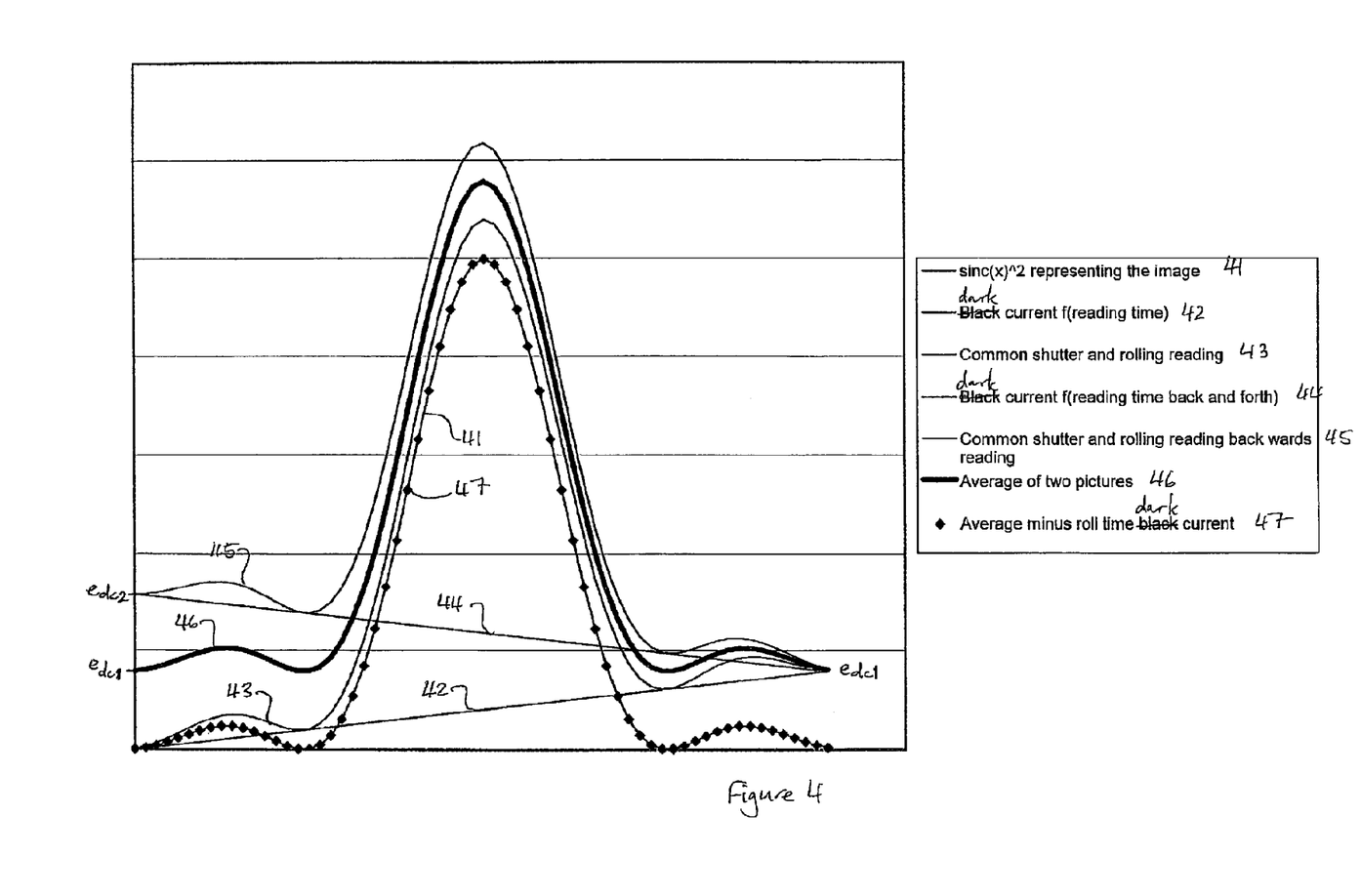
FIG. 4 is a graph showing the removal of dark-current error from an image.

FIG. 4 is a graph showing the evening (averaging) out and removal of dark-current error from an image using the apparatus of the first embodiment. The horizontal axis represents pixels 104 in the pixel array 102. The left-hand end of the horizontal axis indicates pixels read out first in the first reading and last in the second reading, and the right-hand end indicates pixels read out last in the first reading and first in the second reading. The vertical axis represents the light-intensity value read out from the pixels 104. Trace 41 represents the ideal image signal to be captured by the apparatus 100. During the first reading, dark-current error accumulates in each pixel 104 of the array 102 at the same rate and is represented by the trace 42. The trace 42 increases in a linear manner towards the right-hand end of the graph as the pixels are read out in rolling order in that direction. At the end of the first reading, the dark-current error has increased to a level $e_{dc1}$. The light-intensity values read out during the first reading, which include the ideal image signal in addition to a dark-current error, are represented by trace 43. The trace 43 is similar to the ideal trace 41 except that it is offset from the horizontal axis by the dark-current error represented by trace 42. During the second reading, dark-current error continues to accumulate in each pixel at the same rate and is represented by the trace 44. At the end of the second reading, the dark-current error has increased to a level $e_{dc2}$. In this case, the second reading begins immediately after the first reading has finished, such that the dark-current error $e_{dc2}$ is substantially double the dark-current error $e_{dc1}$. The light-intensity values read out during the second reading are represented by trace 45. The trace 45 is similar to the ideal trace 41 except that it is offset from the horizontal axis by the dark-current error represented by trace 42 and additionally by trace 44. The averaging process performed by the noise-compensation circuitry 108 results in values shown by the trace 46. As can be seen in the trace 46, an offset due to dark current error still exists, but the offset is even across the pixel array 102, unlike the traces 43 and 45 in which the offset increases from one end to the other. The offset in trace 46 is $e_{dc1}$ across the full pixel array. The varying offset in traces 43 and 45 represents the gradually-increasing dark-current error described above. Trace 47 represents the averaged light-intensity values after the dark-current error has been subtracted by the noise-compensation circuitry 108. As can be seen, trace 47 is similar to ideal trace 41.

In a second embodiment, the readout circuitry 106 is arranged to obtain a first dark-current error from one or more of the black pixels 104n8 before reading out the other pixels 104n1-104n7. The readout circuitry then reads out values from the pixels 104n1-104n7, line by line (possibly pixel by pixel, as discussed previously), before obtaining a second dark-current error by reading out one or more black pixels 104n8 a second time following the readout of the entire array 102. The noise-compensation circuitry 108 is arranged to interpolate the first and second dark-current errors to calculate a dark current error for each pixel 104n1-104n7, and to subtract the dark-current error from the light-intensity value of each pixel 104n1-104n7 to obtain a noise-compensated light-intensity value for each pixel 104n1-104n7.

Figure 5:
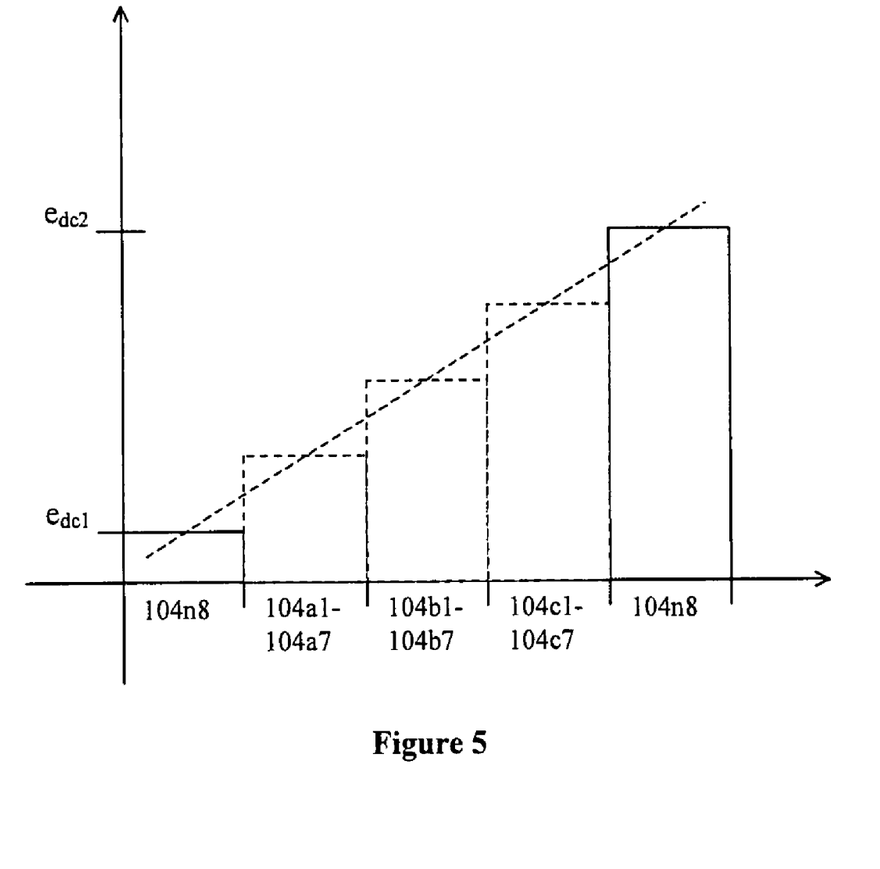
FIG. 5 illustrates a readout method for an exemplary pixel array.

FIG. 5 illustrates the readout method of the second embodiment for an exemplary pixel array comprising three lines of pixels designated 104a1-104a7, 104b1-104b7, 104c1-104c7 and one or more black pixels 104n8. The vertical axis represents dark-current error while the horizontal axis represents the lines 104a1-104a7, 104b1-104b7, 104c1-104c7 of pixels in the array and the black pixels 104n8. The black pixels 104n8 are read out first. Then, the lines 104a1-104a7, 104b1-104b7, 104c1-104c7 are read out in consecutive order before the black pixels 104n8 are read out a second time. The two readings obtained from the black pixels 104n8 represent the first and second dark-current errors $e_{dc1}$ and $e_{dc2}$. Dark-current errors for lines 104a1-104a7 to 104c1-104c7 can readily be calculated by interpolating the first and second dark-current errors, as shown in FIG. 5.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. All possible permutations and combinations of the claims are within the present disclosure whether or not specifically disclosed in that combination or permutation. The applicant indicates that aspects of the present invention may consist of any such individual feature or combination of features. In view of the foregoing description it will be evident to a person skilled in the art that various modifications may be made within the scope of the invention.

It will be appreciated that the aforementioned read-out circuitry, noise compensation circuitry etc. may have other functions in addition to mentioned functions, (of reading out and noise compensation in these cases), and that these functions may be performed by the same circuit.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising:
    a pixel array comprising a plurality of light-sensitive pixels configured to be exposed to light to capture an electronic image;
    readout circuitry arranged to:
    obtain a first dark-current error associated with first light-intensity values read from a first pixel group;
    subsequently read out light-intensity values from an intermediate pixel group in the pixel array to capture light-intensity values for the image; and
    subsequently obtain a second repeat dark-current error associated with second light-intensity values read from the first pixel group, the first pixel group being spaced apart from the intermediate pixel group in the pixel array, and each pixel group comprising one or more pixels;
    wherein the apparatus comprises noise-compensation circuitry configured to:
    compensate for dark current in the pixels of the intermediate pixel group of the pixel array by interpolating the first and second dark-current errors to calculate one or more dark-current errors for the intermediate pixel group; and
    subtract the dark-current error from the light-intensity value of a pixel of the intermediate pixel group to obtain a noise-compensated light-intensity value for said pixel.

2. The apparatus of claim 1 wherein the pixel array comprises one or more optically-shielded light-sensitive pixels configured to be used by the readout circuitry to obtain the first and second dark-current errors.

3. The apparatus of claim 1, wherein the apparatus is configured such that the first and second pixel groups can be exposed to light simultaneously.

4. The apparatus of claim 1, wherein the apparatus is configured such that the first and second pixel groups can be exposed to light at different times.

5. The apparatus of claim 4, wherein the apparatus is configured such that a pixel group can be exposed to light and its light-intensity values read by the readout circuitry before a subsequent pixel group is exposed to light.

6. The apparatus of claim 1, wherein the apparatus comprises a digital camera.

7. The apparatus of claim 1 wherein the apparatus is a module for a digital camera.

8. A method comprising
    exposing a plurality of light-sensitive pixels in a pixel array to light to capture an electronic image;
    obtaining a first dark-current error associated with first light-intensity values read from a first pixel group;
    subsequently reading out light-intensity values from an intermediate pixel group in the pixel array at different times to capture light-intensity values for the image,
    subsequently obtaining a second repeat dark-current error associated with second light-intensity values read from the first pixel group, the first pixel group being spaced apart from the intermediate pixel group in the pixel array and each pixel group comprising one or more pixels;
    compensating for dark current in the pixels of the pixel array by interpolating the first and second dark-current errors to calculate one or more dark-current errors for the intermediate pixel group; and
    subtracting the dark-current error from the light-intensity value of a pixel of the intermediate pixel group to obtain a noise-compensated light-intensity value for said pixel.

9. A computer program product comprising computer-executable code stored on a non-transitory computer-readable medium, the computer-executable code, when run on a computer, causes the computer
    to expose a plurality of light-sensitive pixels in a pixel array to light to capture an electronic image;
    to obtain a first dark-current error associated with first light-intensity values read from a first pixel group;
    to subsequently read light-intensity values from an intermediate pixel group in the pixel array to capture light-intensity values for the image, each pixel group comprising one or more pixels;
    to subsequently obtain a second repeat dark-current error associated with second light-intensity values read from the first pixel group, the first pixel group being spaced apart from the intermediate pixel group in the pixel array;
    to compensate for dark current in the pixels of the pixel array by interpolating the first and second dark-current errors to calculate one or more dark-current errors for the intermediate pixel group; and
    to subtract the dark-current error from the light-intensity value of a pixel of the intermediate pixel group to obtain a noise-compensated light-intensity value for said pixel.

10. An apparatus comprising:
    a pixel array comprising a plurality of light-sensitive pixels configured to be exposed to light to capture an electronic image;
    readout circuitry configured to read out light-intensity values from first and second pixel groups in the pixel array at different times to capture light-intensity values for the image in a first predetermined group order in a first reading, and subsequently to reread light-intensity values from the first and second pixel groups in a second predetermined group order in a second reading, the second predetermined group order being the reverse of the first predetermined group order, each pixel group comprising one or more pixels;
    wherein the apparatus comprises noise-compensation circuitry configured to:
    compensate for dark current in the pixels of the pixel array by calculating an average light-intensity value for a pixel in a respective group from the respective light intensity values obtained for the pixel in the first and second readings; and
    subtract a dark-current error from the average light-intensity value for said pixel to obtain a noise-compensated light intensity value for the pixel.

11. The apparatus of claim 10, wherein the apparatus is configured such that the first and second pixel groups can be exposed to light simultaneously.

12. The apparatus of claim 11, wherein the apparatus is configured such that a pixel group can be exposed to light and its light-intensity values read by the readout circuitry before a subsequent pixel group is exposed to light.

13. The apparatus of claim 10, wherein the apparatus is configured such that the first and second pixel groups can be exposed to light at different times.

14. The apparatus of claim 10, wherein the apparatus comprises a digital camera.

15. The apparatus of claim 10, wherein the apparatus is a module for a digital camera.

16. A method comprising
exposing a plurality of light-sensitive pixels in a pixel array to light to capture an electronic image;
reading light-intensity values from first and second pixel groups in the pixel array at different times to capture light-intensity values for the image in a first predetermined group order in a first reading, and subsequently rereading light-intensity values from the first and second pixel groups in a second predetermined group order in a second reading, the second predetermined group order being the reverse of the first predetermined group order, each pixel group comprising one or more pixels;
compensating for dark current in the pixels of the pixel array by calculating an average light-intensity value for a pixel in a respective group from the respective light intensity values obtained for the pixel in the first and second readings;
subtracting a dark current error from the average light-intensity value for the pixel to obtain a noise-compensated light-intensity value for the pixel.

17. A computer program product comprising computer-executable code stored on a non-transitory computer-readable medium, the computer-executable code, when run on a computer, causes the computer
to expose a plurality of light-sensitive pixels in a pixel array to light to capture an electronic image;
to read light-intensity values from first and second pixel groups in the pixel array at different times to capture light-intensity values for the image in a first predetermined group order in a first reading, and subsequently rereading light-intensity values from the first and second pixel groups in a second predetermined group order in a second reading, the second predetermined group order being the reverse of the first predetermined group order, each pixel group comprising one or more pixels;
to compensate for dark current in the pixels of the pixel array by calculating an average light-intensity value for a pixel in a respective group from the respective light intensity values obtained for the pixel in the first and second readings; and
to subtract a dark current error from the average light-intensity value for the pixel to obtain a noise-compensated light-intensity value for the pixel.

* * * * *